United States Patent [19]

Turner et al.

[11] Patent Number: 5,030,609

[45] Date of Patent: Jul. 9, 1991

[54] PROCESS FOR PRODUCING A HYDROGENATION CATALYST OF COPPER CHROMITE

[75] Inventors: Keith Turner, Stockton-on-Tees; Mohammad Sharif, Middlesbrough; John Scarlett, Spennymoor; Anthony B. Carter, Stockton-on-Tees, all of England; Geoffrey Webb, Stirling, Scotland

[73] Assignee: Davy McKee (London) Limited, London, England

[21] Appl. No.: 224,686

[22] Filed: Jul. 27, 1988

[30] Foreign Application Priority Data

Jul. 29, 1987 [GB] United Kingdom ............... 8717989

[51] Int. Cl.$^5$ .................... B01J 23/26; B01J 23/72
[52] U.S. Cl. .................................................. 502/318
[58] Field of Search ..................... 502/306, 318, 244

[56] References Cited

U.S. PATENT DOCUMENTS

| | | | |
|---|---|---|---|
| 2,040,944 | 5/1936 | Lazier | 260/156.5 |
| 2,079,414 | 5/1937 | Lazier | 260/156 |
| 2,091,800 | 8/1937 | Adkins et al. | 260/156 |
| 2,964,579 | 12/1960 | Kirsch et al. | 502/318 X |
| 3,020,291 | 2/1962 | Dunlop et al. | 502/318 X |
| 3,341,610 | 9/1967 | Dunlop et al. | 502/318 X |
| 4,032,458 | 6/1977 | Cooley et al. | 260/635 D |
| 4,112,245 | 9/1978 | Zehner et al. | 568/864 |
| 4,172,961 | 10/1979 | Henery et al. | 568/864 |
| 4,652,685 | 3/1987 | Cawse et al. | 568/864 |
| 4,666,879 | 5/1987 | Kelly et al. | 502/318 X |

FOREIGN PATENT DOCUMENTS

| | | |
|---|---|---|
| 0060787 | 9/1982 | European Pat. Off. . |
| 0139051 | 5/1985 | European Pat. Off. . |
| 0143634 | 6/1985 | European Pat. Off. . |
| 0191884 | 8/1988 | European Pat. Off. . |
| 2439176 | 6/1979 | France . |
| 858917 | 8/1981 | U.S.S.R. . |
| 1286274 | 1/1987 | U.S.S.R. . |
| 1015945 | 1/1966 | United Kingdom . |
| 1344557 | 1/1974 | United Kingdom . |
| 1454440 | 11/1976 | United Kingdom . |
| 1459335 | 12/1976 | United Kingdom . |
| 1464263 | 2/1977 | United Kingdom . |
| 8603189 | 6/1986 | World Int. Prop. O. . |
| 8607358 | 12/1986 | World Int. Prop. O. . |

OTHER PUBLICATIONS

Johansson et al., "Copper Catalysts in the Selective Hydrogenation of Soybean and Repeseed Oils: The Activity of the Copper Chromite Catalyst", *J. Am. Oil. Chem. Soc.*, 56(2) (1979), pp. 974–980.

Wrobel et al., "Evolution de la Structure et de la Distribution Ionique d'Une Serie de Catalyseurs Type Chromite de Cuivre en Atmosphere Reductrice", *Nouv. J. Chim.*, 8, No. 5 (1984), pp. 291–298.

G-Katalysatoren, "Hydrogenation Catalysts", pp. 1–9, Jul. 1984.

P. W. Atkins, "Physical Chemistry", Second Edition, pp. 727–752.

M. Freidfelder, "Catalytic Hydrogenation in Organic Synthesis", pp. 129–130, (published by John Wiley and Sons, Inc.), 1978.

(List continued on next page.)

*Primary Examiner*—W. J. Shine
*Attorney, Agent, or Firm*—Rothwell, Figg, Ernst & Kurz

[57] ABSTRACT

A copper chromite hydrogenation catalyst of enhanced activity is obtained by an ante-pre-reduction treatment in which a copper chromite catalyst precursor is soaked in a reducing atmosphere at temperatures below a pre-reduction temperature (typically about 140° C.) at which appreciable pre-reduction of the catalyst can be detected. This catalyst is characterized by particles of reduced copper substantially all of which have an average particle size of less than about $300 \times 10^{-10}$ m (300Å), which have an average particle size of less than about $100 \times 10^{-10}$ m (100Å), and which are substantially uniformly distributed on a chromium-containing support. Typically such catalysts exhibit a copper surface area of about 18.5 m$^2$/g as determined by N$_2$O decomposition at 20° C., compared to a corresponding copper surface area of 4.5 m$^2$/g for a catalyst which has been produced by conventional pre-reduction of the same catalyst precursor.

20 Claims, 5 Drawing Sheets

OTHER PUBLICATIONS

"Organic Reactions", vol. 8, Chapter 1, by Homer Adkins.

Kirk-Othmer's "Encyclopedia of Chemical Technology" (Third Edition), vol. 1, pp. 733–739.

Bechara et al., "Selective Hydrogenation of Dienes on Copper Chromite Catalysts II. Structure-Activity Relationships and Catalytic Sites", *Applied Catalysis*, 16 (1985), pp. 15–27.

D'Huysser et al., "Characterisation par L'Etude de Raies E.S.C.A. et Auger D'Un Catalyseur 'Chromite de Cuivre' en Atmosphere Reductrice", *J. Microsc. Spectrosc. Electron.*, 2(6), pp. 609–614 (Translation provided).

Capece et al., "'Copper Chromite' Catalysts: XPS Structure Elucidation and Correlation with Catalytic Activity", *J. Electron Spectrosc. Relat. Phenom.*, 27(2), 1982, pp. 119–125.

Kasaoka et al., "Activity of Copper Chromite System Industrial Catalysts", *Kogyo Kagaku Zasshi*, 73(4), pp. 648–651, (translation provided).

Apai et al., "Relationship between Stable Monovalent Copper-Chromia Catalysts and Activity for Methanol Formation", *J. Chem. Soc. Commun.*, 1984, pp. 212–213.

Fragale et al., "Catalytic Hydrogenation of Vegetable Oils: II. The Activity of the Preproduced Copper Chromite Catalyst", *J. Am. Oil. Chem. Soc.*, 59 (11), pp. 465–469.

Iimura et al., "Catalysis by 'Copper Chromite'. I. The Effect of Hydrogen Reduction on the Composition, Structure, and Catalytic Activity of Methanol Decomposition", *Bull. Chem. Soc. Jpn.*, 56, 1983, pp. 2203–2207.

Banergee et al., "Copper Chromite Catalyst System: Part III—Kinetic Evaluation of Catalytic Hydrogenation of Nitrobenzene to Aniline in a Flow-Reactor", *Fert, Technol.*, 18 (3-4), pp. 1331–134.

Wrobel et al., "Characterisation Catalyseurs a Base De Cuivre Et De Chrome Par Diffraction X, Spectroscopie Infra-Rouge Et Reflectance Diffuse", *Mater. Chem.*, 6(1), 1984, pp. 19–34 (Translation provided).

Evans et al., "Hydrogenolysis of Alkyl Formates Over a Copper Chromite Catalyst", *Applied Catalysis*, 7 1983, pp. 31–41.

Jenck et al., "High-Pressure Competitive Hydrogenation of Ketones on Copper Chromite Catalyst", *Journal of Catalysis* 65, 1980, pp. 133–140.

Sandilya et al., "Studies on the $CuO-Cr_2O_3$ System", *Technology*, 7(4), pp. 292–297.

Fragale et al., "Catalytic Hydrogenation of Vegetable Oils: III. A Comparison of Reactivity and Selectivity between Cyclic Polyenes and Polyunsaturated Fatty Acids with Copper Chromite as Catalyst", *Inorg. Chim. Acta.*, 82(2), pp. 157–160.

Severino et al., "Effect of Composition and Pretreatment on the Activity of Copper-Chromium-Based Catalysts for the Oxidation of Carbon Monoxide", *Ind. Eng. Chem. Prod. Res. Dev.*, 22(3), pp. 396–401.

Subrahmanyam et al., "Studies on pore structure of a commercial copper chromite catalyst: Determination of the S.A. and pore size distribution of commercial copper chromite catalyst by electronmicroscope and comparison of the data with nitrogen absorption", *Proc. Catsympo* 80, *Nat'l Catal. Symp.*, 5th Mtg. date 1980.

Ghorai et al, "Copper Chromite Catalyst System: Part IV—Catalytic Activity and Surface Properties in the Activated State", *Fert. Technol.*, 18 (3-4), pp. 146–151.

De et al., "Studies on Copper Chromite Catalyst Prepared by Two Different Methods", *Proc. Natl. Symp. Catal.*, 4th, Meeting date 1978, pp. 459–462.

Schreifels et al., "An X-ray Photoelectron Spectroscopic Study of Copper Chromite Catalysts", *Appl. Spectrosc.*, 33(4), pp. 380–384.

Gallagher et al., "Examples of the Use of DTA for the Study of Catalytic Activity and Related Phenoma", *Catal. Org. Synth.-Conf.* 5th, Meeting date 1975, pp. 113–136.

Veber et al., "Catalytic Activity of Copper Chromite and of Certain Cobalties on Carriers in the Reaction of Complete Oxidation of Furfuryl Alcohol", *Zh. Prikl. Khim (Leningrad)*, 48(8), pp. 1857–1859.

Rastogi et al., "Solid State Chemistry of Copper Chromite Used as a Catalyst for the Burning of Ammonium Perchlorate/Polystyrene Propellants", *J. Catal.*, 65(1), pp. 25–30.

PROCESS FOR PRODUCING A HYDROGENATION CATALYST OF COPPER CHROMITE

This invention relates to catalysts. In particular it relates to a copper chromite hydrogenation catalyst having exceptional activity and thermal stability.

Copper chromite has long been recognised as an active hydrogenation catalyst which is suitable, inter alia, for hydrogenation of carboxylic acid esters to alcohols, a hydrogenation step that is generally recognised to be difficult to achieve. For example, U.S. Pat. No. 2,040,944, U.S. Pat. No. 2,079,414, U.S. Pat. No. 2,091,800 and FR-A-1276722 all describe production of copper chromite catalysts and their use for hydrogenation of esters of carboxylic acids. According to page 129 et seq of the book "Catalytic Hydrogenation in Organic Synthesis" by M. Freifelder, published by John Wiley and Sons Inc. (1978), the catalyst of choice for hydrogenation (or hydrogenolysis, as it is sometimes alternatively termed) of carboxylic acid esters is barium promoted copper chromite.

A discussion of the use of copper chromite as a catalyst for hydrogenation of esters is to be found in "Organic Reactions", Vol. 8, published by John Wiley and Sons Inc. (1954). Chapter 1 of this reference book is by Homer Adkins and is entitled "Catalytic Hydrogenation of Esters to Alcohols". It is suggested that a "copper chromite" catalyst is more correctly described as an approximately equimolar combination of cupric oxide and cupric chromite, i.e. $CuO, CuCr_2O_4$.

A further description of experimental conditions for use in hydrogenation of esters of carboxylic acids using copper chromite catalysts can be found in Kirk-Othmer's "Encyclopedia of Chemical Technology" (Third Edition), Volume 1, pages 733-739.

Other hydrogenation reactions for which copper chromite hydrogenation catalysts may be used include hydrogenation of carboxylic acids to alchols, of aldehydes to primary alcohols, of ketones to secondary alcohols, of aromatic heterocyclic compounds to hydrogenated forms thereof, of nitro compounds to primary amines, and of compounds containing olefinic unsaturation to the corresponding saturated compounds. Another use for which copper chromite catalysts have been proposed is dehydrogenation of alcohols to aldehydes.

Very many patent specifications disclose use of copper chromite catalysts in hydrogenation of esters. For example, production of butane-1,4-diol and tetrahydrofuran by a liquid phase process in which diethyl maleate is hydrogenated over copper chromite is described in GB-A-1454440 and in GB-A-1464263. A similar process in which a di-($C_1$ to $C_7$ alkyl) succinate is hydrogenated over copper chromite is disclosed in DE-A-2719867. U.S. Pat. No. 4,172,961 describes hydrogenation of a mixture of dibutyl butoxysuccinate, dibutyl maleate and dibutyl fumarate over a copper chromite catalyst. A two stage hydrogenation procedure in which a dialkyl maleate is hydrogenated to the corresponding dialkyl succinate which is then hydrogenated to yield butane-1,4-diol, using in each case a copper chromite catalyst, is described in U.S. Pat. No. 4,032,458. Many other similar ester hydrogenation processes, using copper chromite or barium-promoted copper chromite catalysts, are described in the literature.

A process in which a dialkyl maleate, such as diethyl maleate, is subjected to hydrogenation in the vapour phase in two or more stages to yield butane-1,4-diol is disclosed in EP-A-0143634 and in WO-A-86/03189. A similar procedure in which gamma-butyrolactone is the product of primary interest is described in WO-A-86/07358. The pre-reduction technique of EP-A-0143634 involves pre-heating a copper chromite catalyst under $N_2$ at 42 bar to 175° C., then passing a 2% $H_2$ in $N_2$ gaseous mixture over it for 8 hours, followed by 10% $H_2$ in $N_2$ for a further 16 hours, and then pure $H_2$ for 12 hours. WO-A-86/03189 and WO-A-86/07358 both describe a pre-reduction technique in which an $H_2$ in $N_2$ mixture (containing 1% to 15% $H_2$) at about 120° C. to about 180° C. is used for several days to pre-reduce the catalyst.

U.S. Pat. No. 4,112,245 recommends pre-reduction of copper chromite catalysts with hydrogen at a temperature of from 100° C. to 450° C. with hydrogen pressures of 0.01 to 10 atmospheres.

EP-A-0060787 teaches a process for production of ethylene glycol in which a dialkyl oxalate is reacted in the vapour phase with hydrogen over a copper chromite catalyst. This specification describes a catalyst reduction procedure in which a mixture of a commercially available copper chromite catalyst, Calsicat Code No. E-103TR, was crushed and mixed with an approximately equal volume of gamma-alumina, heated to 140° C. under nitrogen at a rate of about 28° C. to about 56° C. per hour, and heated for 3 hours in a 0.5 mole % $H_2$ in $N_2$ stream, and then the $H_2$ content of the gas stream was increased to 100% as the temperature was increased to the operating temperature (180° C. to 240° C.).

Although a catalyst pre-reduction step is generally a prerequisite for operation in the vapour phase, in many liquid phase processes the catalyst is often reduced in situ in the presence of the carboxylic acid ester or other liquid hydrogenatable material or a solution thereof in an inert solvent. Examples of disclosures of such processes include GB-A-1344557.

In GB-A-1454440 pre-reduction of the copper chromite catalyst is effected by heating to 200° C. to 260° C. under a pressure of hydrogen of from 100 to 300 kg/$cm^2$. Activation of a copper chromite catalyst by heating in a stream of hydrogen for 1 to 10 hours at 200° C. to 300° C. is proposed in GB-A-1459335.

Amongst commercially available copper chromite ester hydrogenation catalysts there can be mentioned Girdler G-13, G-22, G-89, and G-99, Harshaw Cu-1106P, Cu-1107T ⅛", Cu-1411P, Cu-1413P, Cu-1422T ⅛", Cu-1800P, Cu-1803P, and Cu-1910P, and Houdry 536 CP catalysts.

The procedure recommended by the catalyst manufacturers typically involves heating to 150° C. to 160° C. under $N_2$ and then gradually displacing the nitrogen with $H_2$ and raising the temperature to 180° C. The temperature is then raised to 200° C. after which the hydrogen concentration can be increased to 10% by volume or more.

The chemical and physical structures of copper chromite catalysts have been widely studied in the literature. According to R. Bechara et al., Applied Catalysis, 16 (1985), pages 15-27 the catalytic site in hydrogenation of dienes is constituted by a $H^*$, $Cu_B^+$ pair; these authors reduced copper chromium oxides at 150° C. for 16 hours under a 10% hydrogen flow. A. D'Huysser et al., J. Microsc. Spectrosc. Electron., 2 (6), pages 609 to 614, used X-ray photoelectron spectroscopy to study copper chromite, $CuCr_2O_4$,CuO, in the untreated state, after reduction treatment at 150° C. to 180° C., and after reoxidation at 200° C., and concluded that copper is present as Cu° under $H_2$ at 150° C. A further report from the same research group who had studied a copper chromite catalyst which had been reduced with 10% v/v $H_2$ in $N_2$ appeared in Nouv. J. Chim., 6 (9), pages 437 to 442. G. Wrobel et al., Nouv. J. Chim., 8, No. 5 — 1984, pages 291 to 298, studied a series of copper-chromium oxides by means of different techniques and concluded that both H* and $Cu_B{}^+$ species play an important role in selective hydrogenation of polyenes. This paper includes in its FIG. 3 photographs of four reduced copper chromite catalyst samples which show some small grains which are more opaque than the background texture. In specimens B and C the authors estimate the grain size to be roughly between 150 Å and 250 Å ($150 \times 10^{-10}$m and $250 \times 10^{-10}$m). As X-ray diffraction evidence at 2.09 Å ($2.09 \times 10^{-10}$m) indicates a copper grain size of the order of 200 to 250 Å ($200 \times 10^{-10}$m to $250 \times 10^{-10}$m), they say that it seems logical to attribute these particles to the copper metal which would be deposited on the residual spinel phase and confirm this interpretation by a washing test with 1N hydrochloric acid which eliminates the copper and leaves only the fine texture. They also made thermogravimetric investigations at fixed reduction temperatures chosen between 120° C., a temperature below which, they report, there is no reduction, and 210° C. Another paper from the same research group appeared in C.R. Hebd. Seances Acad. Sci., Ser. C, 283(8), pages 335 to 338.

F. M. Capece et al., J. Electron Spectrosc. Relat. Phenom., 27(2) (1982), pages 119 to 125, carried out studies using X-ray photoelectron spectroscopy on copper chromite catalysts which had been used, without pre-reduction, in liquid phase hydrogenation of soybean oil at 200° C. X-ray diffraction was used by L. E. Johansson and S. T. Lundin to study copper chromite catalysts used in liquid phase hydrogenation of soybean and rapeseed oils, as reported in J. Am. Oil Chem. Soc., 56(12), pages 974 to 980. Pre-reduction at temperatures of 200° C. up to 350° C. in pure hydrogen was used in studies on the activity of copper chromite catalysts for dehydrogenation reported by S. Kasaoka et al., Kogyo Kagaku Zasshi, 73(4), pages 648 to 651. Pre-reduction at 270° C., using 20% $H_2$ in He was used by Gustav R. Apai et al., J. Chem. Soc. Commun (1984), pages 212 to 213, in studies on copper chromite catalysts and their activity for methanol formation. Pre-reduction of Girdler G-89 or G-13 copper chromite catalysts by heating under vacuum at 270° C. and then admitting hydrogen at 0.9-1 bar is described by C. Fragale et al., J. Am. Oil Chem. Soc., 59 (11), pages 465 to 469. The Japanese authors, Akira Iimura et al., describe in Bull. Chem. Soc. Jpn., 56, pages 2203 to 2207 (1983) pre-reduction of a copper chromite catalyst at 50 bar using hydrogen in a circulating system at five fixed temperatures, namely 100° C., 200° C., 300° C., 400° C. and 500° C. A. K. Banergee et al., pre-reduced a copper chromite catalyst in hydrogen at 200° C. in their studies on use of their catalyst for hydrogenation of nitrobenzene to aniline; this work is reported in Fert. Technol., 18 (3–4), pages 131 to 134. G. Wrobel et al., reported in Mater. Chem. 6 (1), pages 19 to 34 (1981) that a cubic phase close to gamma-$Cr_2O_3$ was observed in copper chromite catalysts with a Cu/Cr atomic ratio in the range of 0.8 to 1.5; they also reported that treatment with 10% v/v $H_2$ in $N_2$ over a temperature range of 120° C. to 210° C. resulted in the same degree of reduction and selected a temperature of 150° C. for their pre-reduction treatment. Pre-reduction at 215° C. in hydrogen for 16 hours was used by J. W. Evans et al., Applied Catalysis, 7 (1983), pages 31 to 41 in studies on hydrogenolysis of alkyl formates over a copper chromite catalyst.

Jean Jenck et al., reported in Journal of Catalysis 65, pages 133 to 140 (1980) that the best activity and stability of Harshaw's Cu-0402T copper chromite catalyst were obtained with a "wet reduction" procedure in which the catalyst is brought to reaction temperature under a high pressure of hydrogen in the presence of a liquid ketone.

Other studies on the structure and activity of copper chromite catalysts include:

(a) B. Sandilya et al., Technology, 7(4), pages 292 to 297;

(b) C. Fragale et al., Inorg. Chim. Acta., 82(2), pages 157 to 160;

(c) F. Severino et al., Ind. Eng. Chem. Prod. Res. Dev., 22(3), pages 396 to 401;

(d) V. S. Subrahmanyam et al., Proc. Catsympo 80, Natl. Catal. Symp., 5th, Meeting Date 1980, pages 278 to 284;

(e) D. K. Ghorai et al., Fert. Technol., 18 (3–4), pages 146 to 151;

(f) V. N. Sokolova et al., Tr. Gos. Inst. Prikl. Khim., 68, pages 56 to 59;

(g) K. S. De et al., Proc. Natl. Symp. Catal., 4th, Meeting Date 1978, pages 459 to 462;

(h) J. A. Schreifels et al., Appl. Spectrosc., 33(4), pages 380 to 384;

(i) P. K. Gallagher et al., Catal. Org. Synth., [Conf.], 5th, Meeting Date 1975, pages 113 to 136;

(j) N. V. Veber et al., Zh. Prikl. Khim. (Leningrad), 48(8), pages 1857 to 1859; and (k) R. P. Rastogi et al., J. Catal., 65(1), pages 25 to 30.

In the course of our experiments we have found that, if a copper chromite catalyst precursor is heated in a stream of 6% hydrogen in nitrogen from 18° C. to 650° C. at 5° C./minute or at 30° C./minute, there is no apparent uptake of hydrogen, which is indicative of reduction of CuO to $Cu^I$ or Cu°, at temperatures below about 140° C. At the lower heating rate, i.e. 5° C./minute, there is observed a single peak hydrogen uptake rate at 215° C., whilst at the higher heating rate the peak hydrogen uptake rate is observed at 370° C. These results are strongly suggestive that, at temperatures below 140° C., hydrogen has no effect on the structure of the copper chromite catalyst.

If conventional pre-reduction techniques, particularly those recommended by catalyst manufacturers, are used for preparation of the active catalytic species from copper chromite precursors, it is found that the reactivity of the resulting hydrogenation catalyst is somewhat limited, particularly when hydrogenating a dialkyl maleate, such as diethyl maleate, in the vapour phase with a view to producing a mixture of butane-1,4-diol, gamma-butyrolactone and tetrahydrofuran.

There is accordingly need to provide a better method of pre-reducing copper chromite catalysts so as to produce a significantly more active catalyst for use in hydrogenation reactions, such as hydrogenation of dialkyl maleates and other esters under vapour phase hydrogenation conditions.

There is also a need to provide a more active form of copper chromite hydrogenation catalyst. The present invention accordingly seeks to provide an exceptionally active form of copper chromite hydrogenation catalyst. It further seeks to provide improved methods for pre-reduction of copper chromite catalysts which results in production of significantly more active catalysts than conventional procedures.

We have now found most surprisingly that, although there is no discernible reaction when copper chromite is heated in a reducing atmosphere at temperatures below about 140° C., the activity of pre-reduced copper chromite catalysts can be enhanced very significantly by controlled slow heating of the copper chromite catalyst precursor from ambient temperatures up to about 140° C. in a reducing atmosphere.

According to the present invention there is provided a hydrogenation catalyst comprising a reduced copper chromite which is characterised by particles of reduced copper substantially all of which have a particle size less than about $300 \times 10^{-10}$m (less than about 300 Å), which have an average particle size of less than about $100 \times 10^{-10}$m (about 100 Å), and which are substantially uniformly distributed on an amorphous chromium-containing support. Preferably substantially all of the particles of reduced copper have a particle size of at least about $30 \times 10^{-10}$m (about 30 Å) but less than about $100 \times 10^{-10}$m (about 100 Å). The particle size of the copper particles can be determined by conventional transmission electron microscopy techniques.

In contrast to the catalysts of the present invention, which contain essentially no copper particles with a particle size larger than about $300 \times 10^{-10}$m (about 300 Å), and preferably contain essentially no copper particles with a particle size greater than about $100 \times 10^{-10}$m (about 100 Å), we have found that a copper chromite hydrogenation catalyst prepared from a copper chromite catalyst precursor by a conventional pre-reduction technique contains a significant proportion of its copper content in the form of copper particles having a particle size significantly greater than about $300 \times 10^{-10}$m (about 300 Å), e.g. up to about $1500 \times 10^{-10}$m (about 1500 Å) or more, and having an average particle size of about $300 \times 10^{-10}$m (about 300 Å). Hence the exposed surface area of copper is significantly lower in copper chromite catalysts which have been pre-reduced by conventional techniques. In typical experiments catalysts pre-reduced by a conventional technique exhibit copper surface areas of about 4.5m$^2$/g, as determined by N$_2$O decomposition at 20° C., whereas the corresponding typical figure for a catalyst in accordance with the invention is about 18.5m$^2$/g.

All of the currently available experimental evidence tends to suggest that the catalytic activity of copper chromite hydrogenation catalysts is due to the reduced copper metal particles present following pre-reduction. Hence it follows that the activity of the catalyst in hydrogenation reactions will tend to bear a more or less direct relationship to the exposed surface area of reduced copper metal. Thus the larger is the surface area of exposed reduced copper metal, the greater will be the hydrogenation activity of the catalyst, particularly under vapour phase conditions.

The invention further provides in a preferred aspect thereof a hydrogenation catalyst consisting essentially of a reduced copper chromite which is characterised by a surface area of reduced copper as determined by N$_2$O decomposition at 20° C. of at least about 15.0m$^2$/g of catalyst.

DESCRIPTION OF THE PREFERRED EMBODIMENTS

Figure 1:
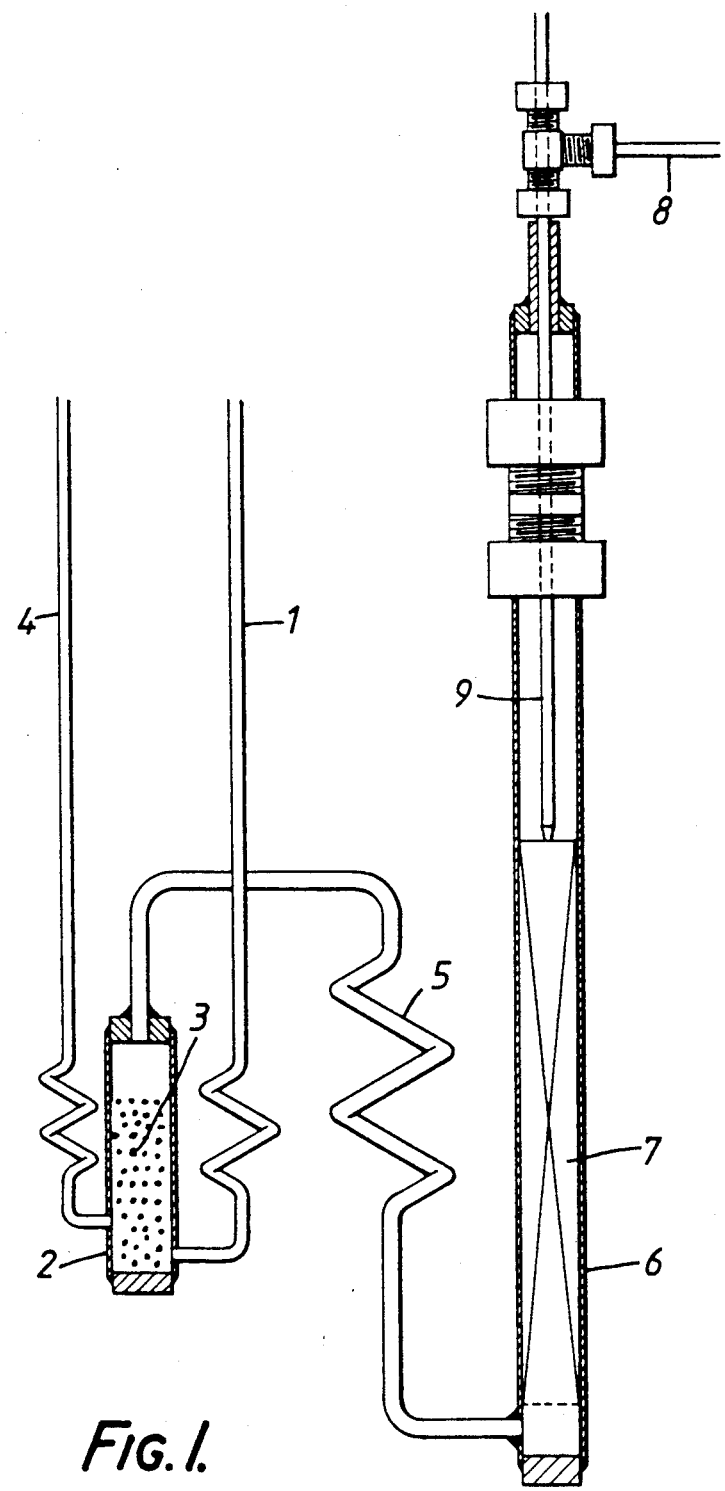
FIG. 1 is a diagram, partially in section, of an apparatus for reducing granular copper chromite catalyst precursor, and utilizing the catalyst for hydrogenation of an ester.

In preferred forms of catalyst in accordance with the invention substantially all of the copper content thereof is present as particles of reduced copper.

It is preferred that, in the catalyst precursors, the Cu:Cr atomic ratio should be from about 0.2:1 to about 4:1, e.g. about 2.5:1. Often the Cu:Cr atomic ratio is from about 0.6:1 to about 2.75:1, typically about 0.6:1 to about 2.0:1, typically from about 0.75:1 to about 1.5:1. In certain preferred catalyst precursors the Cu:Cr atomic ratio is from about 1.2:1 to about 1.4:1, e.g. about 1.3:1. Such catalyst precursors may further contain any of the usual supports, binders and/or promoters. Thus the precursors may contain, for example, from 0.01% up to about 10% by weight of one or more promoters such as gamma-alumina, barium oxide and manganese oxide. The copper chromite precursor may be supported on an inert carrier such as alpha-alumina, silica-alumina, thoria, silicon carbide, titania, zirconia, or carbon. The content of inert carrier may range from about 1% by weight up to about 15% by weight of the catalyst precursor.

Desirably the catalyst precursor has an internal surface area, as measured by the well known BET method, of at least about 20m$^2$/g and preferably at least about 40m$^2$/g. Typically it is in the form of a powder having a particle size of not more than about 100 μm. Such a powder may be formed by conventional techniques into any conventional catalyst shape, such as cylindrical pellets, rings, saddles or the like using the usual binders, and die lubricants, so that the material can be used in fixed bed operations.

The invention also provides a method of producing a hydrogenation catalyst in which a copper chromite is subjected to a pre-reduction treatment by heating in a reducing atmosphere at a pre-reduction temperature at which appreciable pre-reduction of the catalyst can be detected characterised in that, prior to effecting said pre-reduction treatment, the copper chromite is subjected to an ante-pre-reduction treatment by soaking it in a reducing gas atmosphere at a temperature below said pre-reduction temperature. Conveniently heating to said pre-reduction temperature from ambient temperature is effected in a reducing gas atmosphere. This procedure differs from procedures conventionally recommended by manufacturers of copper chromite catalyst precursors in that heating from ambient temperature up to about 170° C. is effected throughout in the presence of a reducing gas. It is not known exactly what mechanism may be involved in production of an active catalyst from the copper chromite precursor but it would appear that the mechanism involves reduction of at least a portion of the copper oxide present to copper metal.

It would appear that, although no discernible reaction can be detected between the catalyst precursor and the reducing gas at temperatures below the pre-reduction temperature (which is typically about 140° C. when the reducing gas contains hydrogen as the reducing constituent), yet some miniscule amounts of copper oxide are in fact reduced whereby sub-microscopic nucleation of copper atoms occurs in a manner analogous to the sub-microscopic nucleation of silver atoms that occurs upon exposure of a photographic film in a camera. Although the latent image cannot be detected visually in an exposed photographic film yet it can be rendered visible as a result of the conventional development process by exposure to a reducing agent. In an analogous fashion, it is postulated, the ante-pre-reduction step of the present invention produces a "latent image" consisting of numerous sub-microscopic nucleations of copper atoms which can grow individually to form a large number of small particles of copper metal, having particle sizes in the range of from about $30 \times 10^{-10}$m (about 30Å) up to about $300 \times 10^{-10}$m (about 300 Å) with an average particle size of about $50 \times 10^{-10}$m (about 50 Å), thus ensuring that the resulting copper chromite hydrogenation catalyst has a correspondingly large exposed surface area of copper metal. On the other hand, if conventional pre-reduction techniques are used, so that rapid pre-heating to temperatures of about 140° C. and higher in the presence of a hydrogen-containing gas is used or if the catalyst is pre-heated to a temperature of at least about 140° C. in an inert gas atmosphere prior to contact with a hydrogen-containing gas, the first relatively few nucleations of copper atoms that form serve as a focus for subsequent reduction of copper oxide to copper metal, with the result that relatively large crystallites of copper metal may form, typically having particle sizes up to about $1500 \times 10^{-10}$m (about 1500 Å) or more, thus resulting in a much reduced exposed surface area of copper and in a lower catalyst activity in hydrogenation reactions.

By adopting a suitable temperature-time profile and monitoring the inlet and exit gas compositions to and from the pre-reduction zone, it can be ensured that any reactions involved in the ante-pre-reduction step or soaking step occur always at the lowest possible temperature and are permitted to occur as completely as possible before the temperature is again raised significantly. In addition any heat produced as a result of exothermic ante-pre-reduction reactions is removed by the reducing gas with minimum risk of thermal damage to the catalyst.

The catalyst precursor comprises copper chromite; it may, for example, consist essentially of copper chromite, or it may be barium-promoted copper chromite, manganese-promoted copper chromite, or a copper chromite containing both barium and manganese as promoters.

In the soaking step of a preferred process of the invention the copper chromite catalyst precursor is maintained in a reducing gas atmosphere at temperatures intermediate ambient temperature (e.g. about 15° C. to about 25° C., typically about 20° C.) and the pre-reduction temperature (which is typically about 140° C.). Soaking can be commenced at temperatures below ambient temperature, e.g. 0° C. or below, but it is believed that little, if any, additional benefit results therefrom. In this soaking step the reducing gas atmosphere typically contains hydrogen or another reducing gas, such as carbon monoxide, or a mixture thereof. Although it is preferred to heat the catalyst precursor during the soaking step from ambient temperature to the pre-reduction temperature throughout in a reducing gas atmosphere, it is alternatively possible to commence heating in an inert gas atmosphere, and to introduce the reducing gas atmosphere at a moderately elevated temperature (e.g. about 40° C. to about 50° C.). It is, however, an essential feature of the process that, the nearer the temperature during the soaking step reaches the pre-reduction temperature, the more important it is that the catalyst precursor be always in contact with a reducing gas atmosphere.

In the soaking step of a preferred process of the invention the catalyst precursor is heated under controlled conditions from ambient temperature (e.g. about 20° C.) in a stream of a reducing gas. This preferably comprises a mixture of a minor amount of hydrogen and a major amount of one or more inert gases, such as nitrogen, argon, neon, methane, ethane, butane, or a mixture of two or more thereof. In a particularly preferred process the reducing gas is a mixture of a minor amount of hydrogen and a major amount of nitrogen, preferably substantially oxygen-free nitrogen.

The soaking step of the process of the invention may be operated at normal or reduced pressure but is preferably operated at an elevated pressure in the range of from about 1 bar to about 20 bar, preferably from about 2 bar to about 10 bar.

The partial pressure of the hydrogen or other reducing gas need be no more than about 0.1 bar, and can be in the range of from about 0.005 bar up to about 0.05 bar, during the soaking step.

In a particularly preferred process of the invention the catalyst precursor is heated from ambient temperature to about 120° C. in a reducing atmosphere containing a minor amount of hydrogen. Preliminary heating of the catalyst precursor from ambient temperature to about 120° C. is preferably effected at a controlled rate; typically this preliminary heating step takes from about 30 minutes to about 3 hours or more, e.g. about 90 minutes. The temperature can be increased at a substantially linear rate during the soaking step or can be increased in an approximately stepwise fashion, in steps of, for example about 5° C. to about 10° C., followed by periods during which the temperature is maintained substantially constant before the temperature is raised again. Over the range of from about 120° C. to about 170° C. heating may follow any temperature-time curve, provided that the rate of heating is such that at all times the catalyst precursor is maintained under reducing conditions with the inlet and exit gas compositions to the pre-reduction zone being substantially identical one to another. Preferably the temperature is increased in an approximately linear fashion from about 120° C. to about 170° C. In one procedure heating is carried out in a series of steps, conveniently steps of approximately 10° C., and a careful check of the inlet and exit gas compositions to the pre-reduction zone is made before, during and after each heating step. Under typical operating conditions the rate of increase of temperature over the temperature range from about 120° C. to about 170° C. is from about 1° C./hour up to about 15° C./hour, e.g. about 10° C./hour.

In this heating step from about 120° C. to about 170° C. the gas flow rate generally corresponds to a gaseous hourly space velocity (measured at 0° C. and 1 bar) of from about 400 hr$^{-1}$ to about 6000 hr$^{-1}$ or more, e.g. about 3000 hr$^{-1}$.

The composition of the reducing gas is dependent upon the operating pressure; the higher the total pressure is, the lower is the maximum permitted hydrogen concentration. Conversely, the lower the total pressure is the higher can be the concentration of hydrogen in the reducing gas. Typically the $H_2$ concentration is from about 0.1% v/v up to about 1% v/v, e.g. about 0.5% v/v, under preferred operating conditions.

Once the catalyst precursor has reached the final temperature of about 170° C. the hydrogen partial pressure is gradually increased. However, during this phase of catalyst activation the inlet and exit gas compositions to the pre-reduction zone should still be closely monitored so that the two compositions are substantially identical at all times.

It is important to ensure that, when the catalyst precursor reaches the pre-reduction temperature, there should not be a substantial excess of hydrogen or other reducing gas present so as to minimise any danger of damage to the catalyst resulting from a thermal runaway due to the exothermic catalyst pre-reduction step.

After pre-reduction the catalyst should at all times be kept under a hydrogen-containing or inert gas atmosphere, if it is desired to avoid reoxidation of the pre-reduced catalyst.

The pre-reduced catalyst produced in accordance with the teachings of the invention is sensitive to oxidation, probably due to re-oxidation of the copper particles. It has further been found that, if a pre-reduced catalyst produced by the process of the present invention is carefully re-oxidised, then upon subsequent re-reduction the resulting re-reduced catalyst retains its enhanced activity that it had following its initial pre-reduction treatment according to the invention and exhibits substantially the same particle size distribution for the resulting copper particles and the same area of reduced copper metal, as measured by $N_2O$ decomposition, as it had after that original pre-reduction treatment. Hence it has proved possible to reoxidise the pre-reduced catalyst without causing the copper particles to sinter and further agglomerate.

Hence the invention also relates to the re-oxidised materials obtained by careful re-oxidation of the pre-reduced copper chromite catalyst. It also relates to the re-reduced catalysts produced upon re-reduction of such re-oxidised materials.

Thus, in accordance with a further aspect of the present invention there is provided a copper chromite composition which is characterised by copper-rich particles substantially all of which have a particle size less than about $300 \times 10^{-10}$m (less than about 300 Å), which have an average particle size less than about $100 \times 10^{-10}$m (about 100 Å), and which are substantially uniformly distributed on an amorphous chromium-containing support. The copper-rich particles are copper-containing aggregates each containing upwards of about 20 copper atoms, and usually at least about 25 to 30 copper atoms. In a re-oxidised composition the exact nature of the copper-rich particles is not yet clear. However, at least a surface layer thereof contains oxygen and probably comprises cuprous oxide ($Cu_2O$) and/or cupric oxide (CuO). Such copper-rich particles may have a core which still contains metallic copper but may further comprise cuprous oxide ($Cu_2O$) and/or cupric oxide (CuO). In a pre-reduced composition it is believed that the copper-rich particles comprise substantially pure metallic copper.

A suitable technique for re-oxidation of a pre-reduced copper chromite involves cooling the catalyst from its final temperature of about 170° C. or higher to room temperature, purging with oxygen-free nitrogen, and then passing a mixture of 2% by volume $O_2$ in $N_2$ through the material until the exit temperature equals the inlet temperature. Thereafter the $O_2$ content of the gas is slowly increased by bleeding in air, whilst still monitoring the inlet and exit temperatures, until the gas is wholly replaced by air. The thus re-oxidised material can be stored in air until required for use. Although it is possible to retain at least some enhancement of catalyst activity by re-reducing the oxidised material by conventional methods, it is preferable to perform said re-reduction by the process of the invention.

The hydrogenation catalysts of the invention can be used in a wide variety of reactions for hydrogenation of an unsaturated organic compound to produce at least one hydrogenation product thereof. Examples of such unsaturated organic compounds are esters, carboxylic acids, aldehydes, ketones, heterocyclic compounds, nitro compounds, and olefinically unsaturated compounds. Another use for the hydrogenation catalysts of the invention is the dehydrogenation of primary alcohols to aldehydes. Such reactions can be carried out as liquid phase reactions or as vapour phase reactions under appropriate reaction conditions. Typical reaction conditions include use of normal or, more usually, elevated pressures, typically in the range of from about 1 bar to about 250 bar, as well as use of elevated temperatures, typically in the range of from about 50° C. up to about 300° C.

Examples of esters that can be hydrogenated using the catalysts of the invention include esters of monocarboxylic, dicarboxylic and polycarboxylic acids with monohydric alcohols (such as alkanols), dihydric alcohols (or glycols), or polyhydric alcohols (such as glycerol). Esters of commercial importance for the production of alcohols by hydrogenation include alkyl esters of alkylcarboxylic acids of the general formula:

R.CO.OR', in which R and R' are each independently of the other a $C_1$ to $C_{18}$ alkyl radical, including methyl acetate and ethyl acetate for production of ethanol, n-propyl propionate for production of n-propanol, n-butyl butyrate for production of n-butanol, 2-ethylhexyl 2-ethylhexanoate for production of 2-ethylhexanol, methyl laurate for production of dodecanol, methyl palmitate and methyl palmitoleate for production of hexadecanol, and methyl stearate, methyl oleate and methyl linoleate for the production of octadecanol. Other commercially important esters for hydrogenation purposes include glycerides of long chain fatty acids for production of the corresponding long chain alkanols, e.g. glyceryl stearate, and alkyl esters of glycolic acid, such as methyl glycolate and ethyl glycolate for the production of ethylene glycol. Dicarboxylic acid esters which are useful hydrogenation feedstocks include dialkyl oxalates, such as dimethyl oxalate and diethyl oxalate for the production of ethylene glycol, and dialkyl maleates, fumarates and succinates, such as dimethyl, diethyl and di-n-butyl maleates, fumarates and succinates for the production of butane-1,4-diol, gamma-butyrolactone and tetrahydrofuran. Typical vapour phase operating conditions include use of pressures in the range of from about 5 bar to about 50 bar, temperatures in the range of from about 150° C. to about 240° C., and a hydrogen ester molar ratio of from about 100:1 to 500:1. When operating in the liquid phase the pressure and temperature may be higher and are typically at least about 70 bar and at least about 240° C. respectively, for example in the ranges of from about 200 bar to about 280 bar and from about 280° C. to about 330° C.

As examples of aldehydes that can be hydrogenated to the corresponding primary alcohols there can be mentioned benzaldehyde, furfural, and n-butyraldehyde. Ketones which can be hydrogenated to secondary alcohols using the catalyst of the invention include acetone, methyl ethyl ketone, pinacolone, benzophenone, and acetophenone. Aromatic heterocyclic compounds which can be hydrogenated to non-aromatic heterocyclic compounds include pyridine and quinoline, the products respectively being piperidine and tetrahydroquinoline. Hydrogenation of nitrobenzene to aniline is an example of a hydrogenation reaction utilising a nitro compound. As an example of a hydrogenation reaction involving an olefinically unsaturated compound that can use a catalyst according to the invention there can be mentioned the hydrogenation of cyclohexene to cyclohexane. Typical reaction conditions include pressures of from about 5 bar to about 150 bar and temperatures of from about 50° C. to about 150° C. The process can be operated as a liquid phase process or as a vapour phase process.

The invention is further illustrated in the following Examples.

EXAMPLE 1

The apparatus used in this Example is illustrated in FIG. 1 of the accompanying drawings. It was charged with 50 ml of granular copper chromite catalyst precursor (PG 85/1 copper chromite catalyst available from Davy McKee (London) Limited, 250 Euston Road, London, NW1 2PG, England). The crushed material was in the form of approximately 2 mm×2 mm granules. The nominal chemical composition of PG 85/1 copper chromite catalyst is 42% by weight Cu and 26.5% by weight Cr, corresponding to a Cu/Cr atomic ratio of 1.26. Its surface area, as measured by the BET method, is 40 $m^2/g$.

The apparatus was arranged for heating by means of a fluidised sand bath (not shown). Gas was introduced by way of a pressure regulator and flow controller (not shown) through line 1 to the bottom end of a vaporiser 2 containing a number of steel balls 3. Once the catalyst had been pre-reduced according to the procedure described below, ester was metered as a liquid to vaporiser 2 through line 4. The resulting vaporised mixture of ester and gas was passed through preheating coil 5 to reactor 6. This contained a layer of glass balls, on which rested the catalyst bed 7. The upper end of the reactor 6 was fitted with an exit tube 8 which led to a condenser (not shown) and then to a pressure let-down valve (not shown). The exit gas flow rate was measured downstream from the condenser using a wet gas meter (also not shown). The temperature at this exit end from the catalyst bed was monitored by means of a thermocouple 9.

The composition of the condensate was analysed by gas chromatography using a 1.82 meter long stainless steel column with an internal diameter of 3.18 mm containing 10% diethylene glycol succinate on Chromosorb PAW, a helium gas flow rate of 30 ml/minute and a flame ionisation detector. The instrument was fitted with a chart recorder having a peak integrator and was calibrated using a mixture of diethyl maleate, diethyl succinate, gamma-butyrolactone, butane-1,4-diol, tetrahydrofuran, ethanol and water of known composition. The identity of the peaks was confirmed by comparison of the retention times observed with those of authentic specimens of the materials in question and by mass spectrometry.

A similar gas chromatographic technique was used to analyse the gas stream exiting the apparatus.

Pre-reduction of the catalyst was accomplished as follows:

After charging the reactor 6 with 50 ml of granular PG 85/1 catalyst precursor the whole apparatus was purged with nitrogen at 4.45 bar (50 psig) at ambient temperature and at a flow rate of 150 liters/hour (measured at 0° C. and 1 bar).

The gas composition was then changed to 0.5% v/v $H_2$ in nitrogen and the pressure and gas flow rate were maintained constant. The temperature of the reactor was then raised from ambient to 120° C. over 1.5 hours.

When the temperature of the sand bath reached 100° C. the exit gas stream was analysed in order to confirm that the exit gas composition was the same as the inlet gas composition.

The temperature was then increased from 120° C. to 130° C. over the course of 1 hour, whilst checking every 15 minutes that the $H_2$ concentrations in the inlet and exit gas streams were the same.

The temperature was then raised from 130° C. to 140° C., then from 140° C. to 150° C., and from 150° C. to 160° C., in each case over the course of 1 hour. Each 10° C. increase in temperature was commenced only after it had been confirmed that the $H_2$ concentrations in the inlet and exit gas streams were the same.

Once the temperature had reached 160° C., the catalyst was maintained at this temperature until the $H_2$ concentration in the exit gas stream equalled that in the inlet gas stream. The temperature was then raised to 170° C. over 1 hour, again analysing the inlet and exit gas streams every 15 minutes.

After the system had stabilised at 170° C. so that the $H_2$ concentration in the inlet gas stream (0.5% v/v) was the same as that in the exit gas stream the inlet hydrogen concentration was increased gradually to 1.0% v/v and the gas flow maintained until the exit gas stream had the same composition (i.e. 1% v/v $H_2$ in $N_2$). Next the inlet hydrogen concentration was gradually increased to 5% v/v $H_2$ in $N_2$ over the course of 2 hours and the gas flow was again maintained until inlet and exit hydrogen levels were the same. Using the same technique the inlet $H_2$ content was increased to 10% v/v over the course of the next hour. Once the system has re-stabilised itself at the 10% $H_2$ in $N_2$ level and the inlet and exit gas compositions were the same, the hydrogen concentration was then increased gradually to 100% v/v over the course of the next hour. The pressure was then raised to 28.6 bar (400 psig) and maintained at this level for 3 hours. The activated catalyst was then ready for use.

Diethyl maleate was fed to the vaporiser 2 at a liquid hourly space velocity of 0.15 $hr^{-1}$. The reactor temperature was 170° C. and the $H_2$/ester molar ratio was 300:1. Analysis of the condensate and exit gas stream indicated that diethyl maleate was readily converted to diethyl succinate since essentially no diethyl maleate was detected in the reaction mixture which contained diethyl succinate, gamma-butyrolactone, butane-1,4-diol, tetrahydrofuran and water, besides trace amounts (less than 0.01 mole % each) of minor by-products including 2-ethoxytetrahydrofuran and 2-ethoxybutane-1,4-diol. From the results obtained it was calculated that 98.2% of the diethyl succinate, which had been produced by the facile hydrogenation of diethyl maleate to diethyl succinate in passage through the copper chromite bed, had been converted to products (i.e. gamma-butyrolactone, butane-1,4-diol, tetrahydrofuran and water).

COMPARATIVE EXAMPLE A

Another 50 ml sample of granular PG 85/1 catalyst was charged to the apparatus used in Example 1 and was activated as follows: after pressure testing the apparatus and flushing it with nitrogen at room temperature, the pressure was set to 4.45 bar (50 psig) at a flow rate equivalent to a gaseous hourly space velocity of 3000 $hr^{-1}$, i.e. 150 liters/hour (measured at 0° C. and 1 bar). The reactor was then heated to 140° C. After attaining a steady temperature of 140° C., the gas composition was changed to 0.2% v/v $H_2$ in $N_2$. After 48 hours under these conditions, or when the inlet $H_2$ concentration equalled the exit $H_2$ concentration, if this event occurred sooner, the inlet $H_2$ concentration was gradually raised to 1% v/v $H_2$ in $N_2$ over a period of at least 24 hours. The temperature was then maintained at 140° C. for 24 hours after the exit $H_2$ concentration reached 1% v/v $H_2$ in $N_2$. The temperature was then raised to 180° C. and held at this temperature for 24 hours, whereafter the inlet $H_2$ concentration was raised to 100% over 24 hours. Before use the catalyst was held at this temperature under an $H_2$ atmosphere for between 12 and 24 hours. The activated catalyst was then ready for use.

Upon repeating the hydrogenation experiment of Example 1, using the thus activated catalyst, diethyl maleate (supplied at a liquid hourly space velocity of 0.15 $hr^{-1}$) was again converted readily to diethyl succinate at a reaction temperature of 170° C. and at a pressure of 28.6 bar (400 psig) and at an $H_2$:ester molar ratio of 300:1, but the subsequent conversion to products (i.e. gamma-butyrolactone, butane-1,4-diol, tetrahydrofuran and water) was much lower, i.e. 15.3%.

These results indicate that the catalyst activated according to the present invention possesses a much enhanced activity compared with a conventionally activated copper chromite catalyst.

EXAMPLES 2 TO 4

A sample of PG 85/1 copper chromite catalyst precursor in the form of 4.5×4.5 mm pellets was crushed to yield approximately 2×2 mm granules. 3 ml of these granules were loaded into the catalyst chamber 6 of an apparatus of the type illustrated in FIG. 1. Oxygen-free nitrogen was passed through the reaction chamber at an exit pressure of 4.45 bar and a flow rate of 200 liters/hour (measured at 0° C. and 1 bar) at room temperature (20° C.) for 30 minutes. Then hydrogen was admitted to the nitrogen flow to give a 0.2% hydrogen in nitrogen flow at the same total flow rate. The temperature of the reaction chamber 6 was gradually raised over a 2 hour period to 140° C., the 0.2% hydrogen in nitrogen flow being maintained at the same flow rate. The inlet and outlet gases were continuously monitored by thermal conductivity. When no further hydrogen uptake could be detected, the hydrogen level in the gas flow was gradually increased by 1% over approximately 24 hours. When no further uptake of hydrogen could be detected, the temperature was increased at 5° C. per hour to 160° C. and maintained at this temperature for 4 hours. The following sequence was then followed:

(a) the hydrogen concentration was gradually increased to the 5% level and the system maintained under these conditions for 4 hours;

(b) the catalyst temperature was increased by 5° C. per hour to 180° C. and the system maintained at this temperature for 4 hours; and (c) finally the hydrogen level was increased to 100% over a period of 6 hours, with the catalyst temperature at 180° C., and the system conditions maintained for a period of 18 hours.

After this reduction procedure, the catalyst was cooled in an oxygen free helium flow to 20° C., and the copper surface area was determined by reaction of the reduced copper surface with nitrous oxide at 80° C. according to the equation:

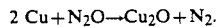

Assuming a surface copper atom exposure of $1.68 \times 10^{19}$ atoms $m^{-2}$ (as used by B. E. Sundquist, Acta Met., 12, 67 (1964), the extent of reaction, and hence the number of oxygen atoms absorbed on the copper surface, was determined by successive injections of nitrous oxide into the helium flow stream until no further reaction was detected, as shown by the absence of nitrogen in the reactor eluant.

Examples 2 and 3 were carried out on samples pre-reduced by the above described procedure. In Example 4 a 10 ml sample of the PG 85/1 copper chromite catalyst precursor pellets was used which had not been crushed.

The following uptakes and the corresponding Cu metal surface areas were recorded:

TABLE 1

| Example No. | Wt. of Catalyst (g) | Amount $N_2O$ reacted (molecules/g) | Cu Surface Area ($m^2$/g) |
| --- | --- | --- | --- |
| 2. | 1.339 | 1.563 × $10^{20}$ | 18.61 |
| 3. | 1.419 | 1.548 × $10^{20}$ | 18.43 |
| 4. | 6.006 | 1.542 × $10^{20}$ | 18.36 |

COMPARATIVE EXAMPLES B AND C

The catalyst chamber 6 of the apparatus of Example 2 was charged with a further 3 ml sample of approximately 2×2 mm granules obtained by crushing PG 85/1 copper chromite catalyst precursor pellets.

Oxygen-free nitrogen was passed through the catalyst chamber 6 at an exit pressure of 4.45 bar and a gaseous hourly space velocity of 3000 hr$^{-1}$. The catalyst was heated to 140° C. under these conditions over a period of 2 hours. With the temperature at 140° C., 0.2% hydrogen was admitted into the nitrogen flow and the system maintained under these conditions for 48 hours, when no further hydrogen uptake was observed. Then the hydrogen level was increased to 1% over a period of 24 hours and the catalyst was maintained at 140° C. for a further 24 hours, when no futher hydrogen uptake was observed by thermal conductivity. The temperature was then increased to 180° C. at 5° C. per hour and the flow of 1% hydrogen in nitrogen maintained for a further 24 hours. Finally the hydrogen concentration was increased to 100% over a 24 hour period and maintained at this level for 18 hours before characterisation.

A similar procedure was used in Comparative Example C, except that a 10 ml sample of the non-crushed PG 85/1 4.5×4.5 mm pellets was loaded into the catalyst chamber 6.

Using the nitrous oxide reaction technique of Example 2 the following results were obtained:

TABLE 2

| Comparative Example No. | Wt. of Catalyst (g) | Amount N$_2$O reacted (molecules/g) | Cu Surface Area (m$^2$/g) |
|---|---|---|---|
| B. | 1.227 | 3.66 × 10$^{19}$ | 4.36 |
| C. | 6.023 | 3.81 × 10$^{19}$ | 4.54 |

Comparison of these results shows that the soaking step of Examples 2 to 4 leads to a greatly increased copper surface area.

EXAMPLES 5 TO 7

It has previously been shown, in the course of work on adsorption of carbon monoxide on fully hydrogen reduced, unsupported copper catalysts, that the adsorption of carbon monoxide results in the retention of small quantities of the adsorbate gas on bare copper surfaces. Similar studies using copper catalysts which have been intentionally oxidised to small extents show that the adsorption of carbon monoxide at 20° C. results in the production of some carbon dioxide by reaction with the oxidised copper surface.

Three further 3 ml samples of PG 85/1 copper chromite catalyst precursor were reduced according to the procedure described in Example 2 and then cooled in a de-oxygenated helium flow to 20° C. over a period of approximately 1 hour. Successive pulses of 10% carbon monoxide in helium were then admitted to the helium stream and passed over the catalyst. The reactor eluant was passed through a nitrogen cold trap to freeze out any carbon dioxide and thence to a thermal conductivity detector to determine the uptake of the carbon monoxide. Using this pulse technique, only strongly retained carbon monoxide is adsorbed. This amounts commonly to less than 10% of the monolayer saturation value for carbon monoxide adsorptions which are carried out in static systems.

Following the adsorption, the eluant cold trap was warmed to check for amounts of carbon dioxide produced. The catalyst was then subjected to a temperature-programmed desorption using a heating rate of 10° C./minute, and the desorption spectrum of the adsorbed material determined. The desorption spectrum showed two peaks, one at 80° C.–110° C., characteristic of strongly adsorbed carbon monoxide adsorbed on copper, together with a smaller peak at 300° C.–320° C. which is ascribed to adsorption of carbon monoxide, probably as carbon dioxide, on the chromia support.

The adsorption results and the temperature-programmed desorption results are shown in Table 3. All adsorption measurements were made at 20° C.

TABLE 3

| Example No. | Catalyst weight (g) | Amount CO absorbed (molecules/g) | Temperature-Prog. Desorption Peaks (molecules/g) | |
|---|---|---|---|---|
| | | | 80° C. | 300° C. |
| 5. | 1.335 | 1.855 × 10$^{19}$ | 2.98 × 10$^{18}$ | 1.29 × 10$^{18}$ |
| 6. | 1.374 | 2.255 × 10$^{19}$ | 3.06 × 10$^{18}$ | 1.68 × 10$^{18}$ |
| 7. | 1.955 | 2.117 × 10$^{19}$ | ←(Not Examined)→ | |

It must be noted that in each of Examples 5 to 7 there was no evidence for any carbon dioxide formation during carbon monoxide adsorption. This clearly suggest that, using the reduction procedure of Example 2, the catalysts were fully reduced.

COMPARATIVE EXAMPLES D AND E

Using three different catalyst samples reduced by the procedure of Comparative Example B, it proved impossible to obtain, using the adsorption-desorption technique of Example 5 to 7, quantitative estimates of the amount of carbon monoxide adsorbed, due to a continued reduction of the catalyst sample, although it was apparent that some uptake of carbon monoxide had occurred. However, the passage of pulses of carbon monoxide over the catalyst resulted in the formation of carbon dioxide, which was measured quantitatively. Subsequent temperature-programmed desorption showed the presence of some adsorbed carbon monoxide on the surface. The results are shown in Table 4.

TABLE 4

| Comparative Example No. | Catalyst weight (g) | Amount CO$_2$ formed (molecules/g) | Temperature-Prog. Desorption Spectra (molecules/g) | |
|---|---|---|---|---|
| | | | 110° C. | 320° C. |
| D | 1.378 | 1.125 × 10$^{18}$ | 1.112 × 10$^{18}$ | 6.50 × 10$^{17}$ |
| E | 1.645 | 1.093 × 10$^{18}$ | 0.938 × 10$^{18}$ | 5.62 × 10$^{17}$ |

This marked difference in behaviour towards carbon monoxide between the catalyst reduced by the procedure of Example 2, compared with the catalyst reduced by the procedure of Comparative Example B, clearly shows that the reduction procedure of Comparative Example B leaves a considerable amount of oxygen on the copper surface. From the yields of carbon dioxide the oxygen surface coverage following the hydrogen activation procedure of Comparative Example B was estimated to be a minimum of 5% of the available copper area as estimated by nitrous oxide decompositions.

The presence of oxygen on the surface following reduction is also apparent from the temperature-programmed desorption spectrum which shows that the carbon monoxide (i.e. the 110° C. peak) is more strongly held than that adsorbed on the catalyst reduced by the procedure of Example (see Table 3).

EXAMPLE 8

It has previously been shown that the adsorption of carbon dioxide on "clean" unsupported copper and copper/zinc oxide/alumina catalysts can be used to provide a good test for the absence of surface oxygen on the copper component by the extent of dissociative chemisorption to form carbon monoxide at moderately low temperatures, in the absence of hydrogen, thereby avoiding the possibility of the water gas shift reaction. This method was therefore used with catalysts reduced by the procedure of Example 2 to confirm the findings from the carbon monoxide adsorption measurements of Examples 5 to 7.

Small pulses of carbon dioxide were introduced into the helium stream over the catalyst and the uptake measured by thermal conductivity. Following adsorption to saturation, the catalyst was subjected to a temperature-programmed desorption up to 220° C. at a heating rate of 5° C./minute in a helium stream. The results are shown in Table 5.

TABLE 5

| Example No. | Catalyst weight (g) | Amount $CO_2$ adsorbed (molecules/g) | T-P Desorption Spectra 90° C. Peak (molecules/g) |
|---|---|---|---|
| 8 | 1.601 | $3.36 \times 10^{19}$ | $5.58 \times 10^{18}$ |
| 9 | 1.241 | $3.70 \times 10^{19}$ | $5.20 \times 10^{18}$ |

From these results it is clear from the desorption spectrum at 90° C. that there is substantial dissociation of the carbon dioxide on the reduced catalyst, supporting the view that the copper surface is substantially free of oxygen in its freshly reduced state. The uptake of carbon dioxide by these catalysts is somewhat greater than that for carbon monoxide. This is probably due to additional adsorption of carbon dioxide on the chromia component of the catalyst. Comparison of the amounts of carbon monoxide desorbed from the carbon dioxide pre-covered surface and the amounts adsorbed in the carbon monoxide adsorption studies (Table 3) indicates an approximate coverage of 25% of the carbon monoxide surface sites by dissociative adsorption of carbon dioxide.

No studies were made of the adsorption of carbon dioxide on the catalysts of Comparative Example B, since it appears unlikely that it would be possible to differentiate between carbon dioxide adsorbed on the partially oxidised copper and carbon dioxide adsorbed on the chromia component of the catalyst.

EXAMPLE 9

The particle size distribution of catalysts reduced by the procedure of Example 2 was determined using transmission electron microscopy. Following reduction according to Example 2 the catalyst was cooled to ambient temperature in a flow of oxygen-free helium. The catalyst chamber was then flushed with oxygen-free nitrogen and the catalyst quickly discharged into deionised water for transfer to the specimen chamber of the electron microscope. Contact with the atmosphere in this process was kept to a minimum. As noted below, some of the samples had previously been used for adsorption/desorption studies before being examined by transmission electron microscopy.

Figure 2:
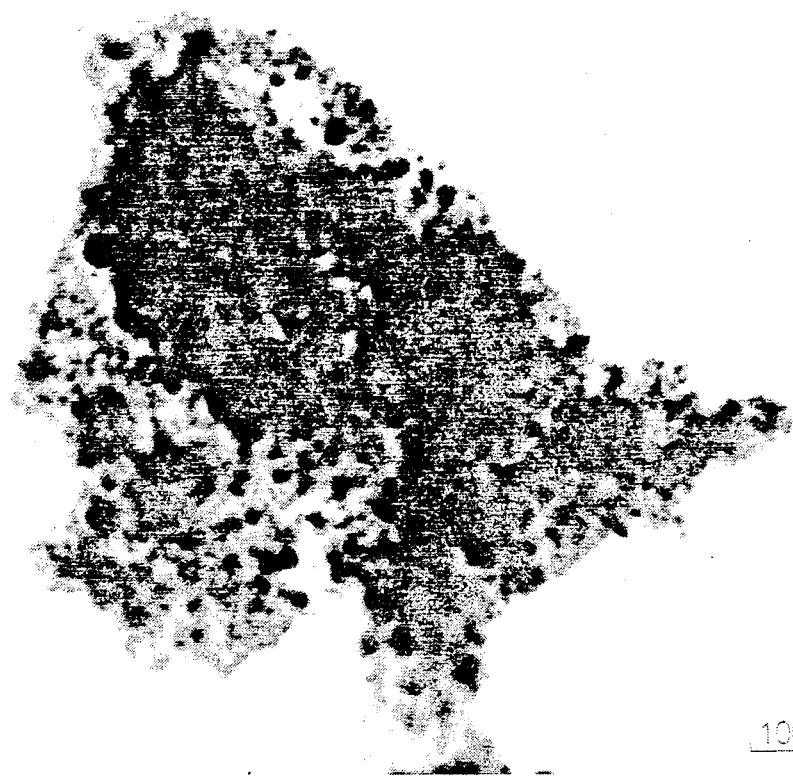
FIG. 2 is a micrograph of a copper chromite catalyst in accordance with the invention at a magnification of $\times 180,000$.
Figure 3:
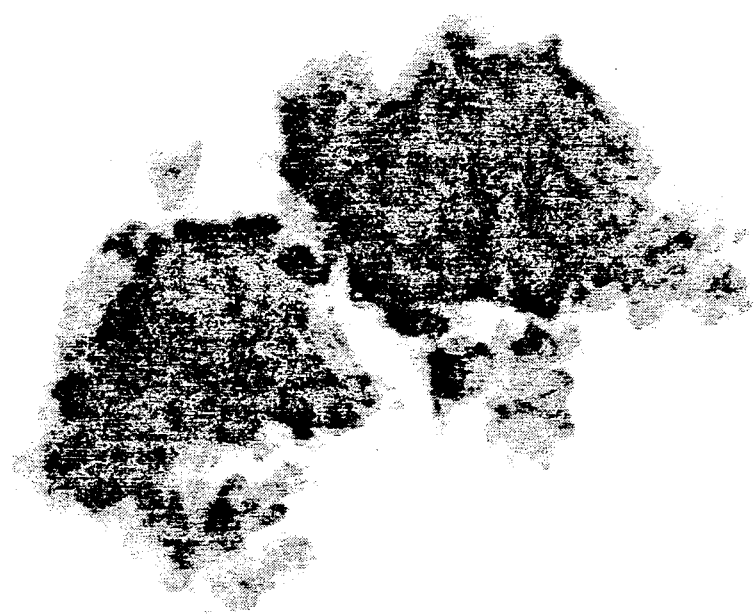
FIG. 3 is a micrograph similar to FIG. 2 but at a magnification of $\times 500,000$.
Figure 4:
FIG. 4 is a micrograph of a copper chromite catalyst produced in accordance with a prior art procedure at a magnification of $\times 180,000$.
Figure 5:
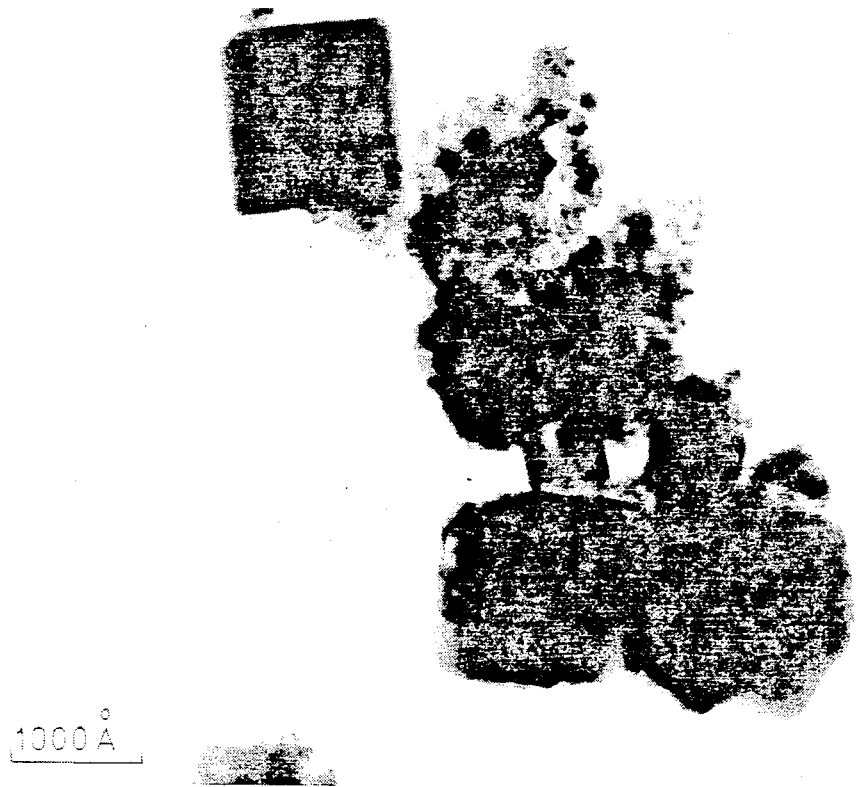
FIG. 5 is a micrograph of the prior art sample of FIG. 4 at a magnification of $\times 215,000$.
Figure 6:
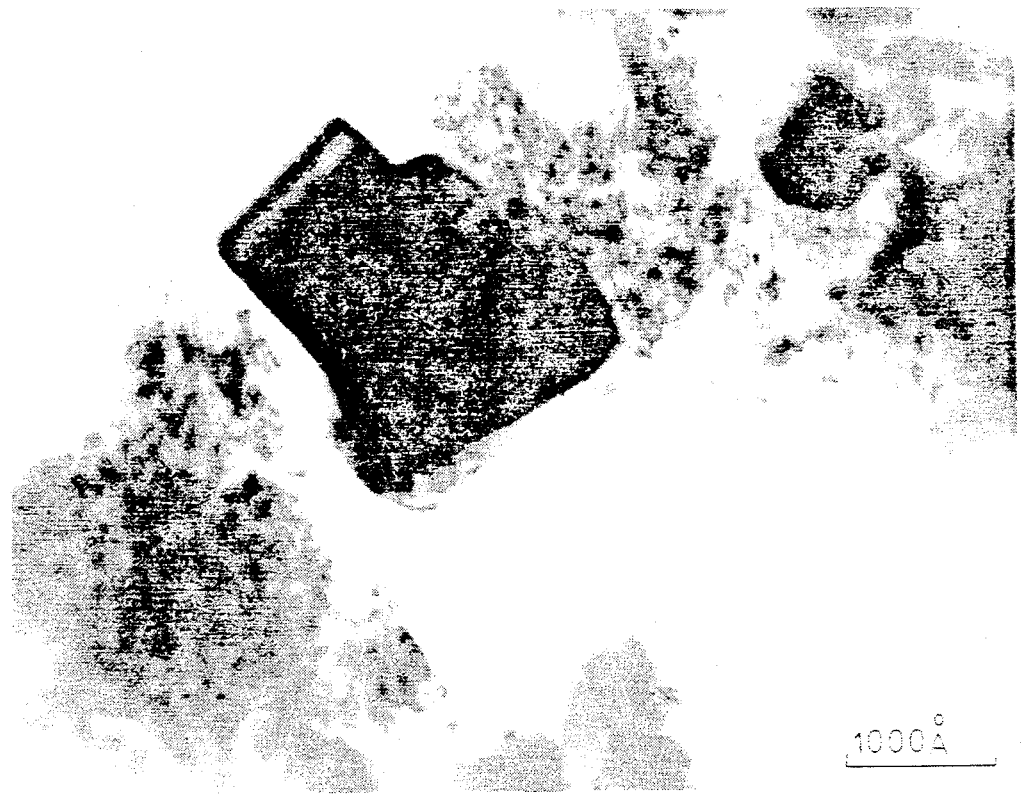
FIG. 6 is a micrograph of a copper chromite catalyst produced in accordance with a prior art procedure at a magnification of $\times 190,000$.
Figure 7:
FIG. 7 is a micrograph of a prior art copper chromite catalyst similar to FIG. 6 but at a magnification of $\times 160,000$.
Figure 8:
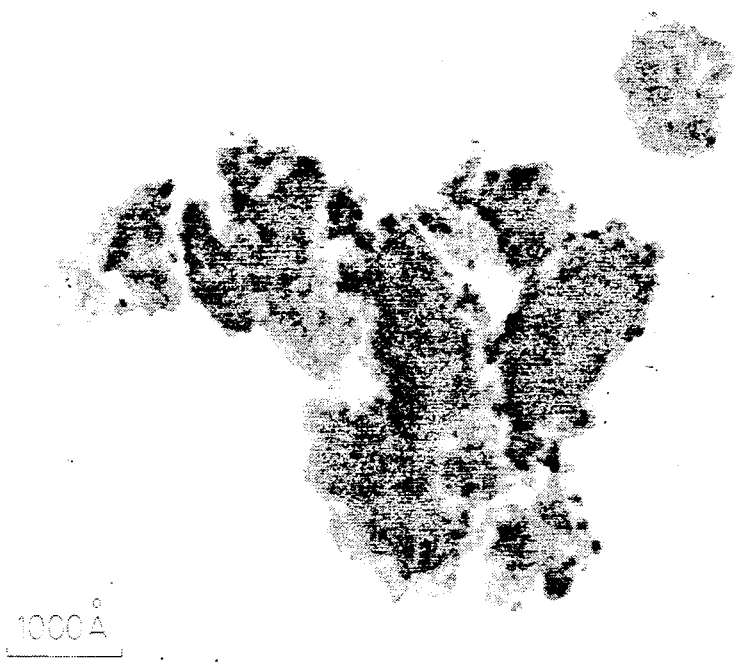
FIG. 8 is a micrograph of a reduced copper chromite catalyst in accordance with the invention at a magnification of $\times 180,000$.
Figure 9:
FIG. 9 is a micrograph similar to FIG. 8.

Typical micrographs of the reduced catalysts are shown in FIGS. 2 to 9 of the accompanying drawings, in which:

FIGS. 2 and 3 are micrographs of samples of the reduced catalyst of Example 8 at magnifications of ×180,000 and ×500,000 respectively;

FIGS. 4 and 5 are micrographs of a catalyst sample which had been crushed to ca. 2 mm×2 mm particles before activation by the procedure of Comparative Example B at magnifications of ×180,000 and ×215,000 respectively;

FIGS. 6 and 7 are micrographs of the catalyst of Comparative Example B, after it had been used for area determination by nitrous oxide decomposition, at magnifications of ×190,000 and ×160,000 respectively; and FIGS. 8 and 9 are typical micrographs of the catalyst of Example 2 after pre-reduction thereof at magnifications of ×180,000.

From these micrographs, which are typical of a number examined for each type of catalyst sample, it is very clear that there is a very marked difference between the samples activated by the procedure of Example 2 and those activated by the procedure of Comparative Example B in terms of the particle sizes of the reduced copper particles. In the micrographs of FIGS. 2 to 9, the copper particles appear as dark areas on a lighter background which is an amorphous chromia support.

Although due to contrast difficulties, which arise due to the similarities in the atomic number of chromium and copper, and the opacity of the chromia support, it is not possible to make a complete particle distribution analysis of the samples, the copper particle size ranges can be estimated in each of the catalysts as shown in Table 6, from which it will be seen that, in catalysts prepared according to the invention by the procedures of Examples 2, 3, 8 or 9, the average copper particle size is less than about $100 \times 10^{-10}$ m (less than 100 Å).

TABLE 6

| FIG. Nos. | Size Range in $10^{-10}$ m(Å) | Average Size in $10^{-10}$ m(Å) |
|---|---|---|
| 2 and 3 | 30–300 | ca. 50 |
| 4 and 5 | 30–1500 | ca. 300 |
| 6 and 7 | 30–1600 | ca. 300 |
| 8 and 9 | 30–300 | ca. 50 |

It is clear from the micrographs of FIGS. 2, 3, 8 and 9 that the catalysts of the invention are substantially unaffected by the particle size geometry in the reduction process, the uncrushed pellets giving essentially exactly the same particle size range and approximate average size as the smaller ca. 2 mm×2 mm "crushed" particles. It is also clear that the catalysts of the invention are thermally stable up to temperatures in excess of 220° C. as shown by the close similarities between FIGS. 2 and 3, on the one hand, and FIGS. 8 and 9, on the other hand.

EXAMPLE 10

To investigate possible differences between the reduction processes of Example 2 and of Comparative Example B in terms of possible reduction of the copper chromite catalyst at lower temperatures than the starting temperature for the process of Comparative Example B, which might account for the large difference between the results obtained by this process and the process of Example 2, the temperature-programmed reduction profile of the copper chromite was determined using 6% hydrogen in nitrogen at a flow rate of 20 ml/minute over the temperature range 18° C. to 650° C. with a slow ramping rate of 30° C./minute and a fast ramping rate of 50° C./minute. The profiles showed that there was no apparent uptake of hydrogen at temperatures below about 140° C., even with the slow heating rate, and that the profile consists of one single peak with a $T_{max}$ at 215° C. (slow ramp) or 370° C. (fast ramp), i.e. any reduction of the chromite occurs concomitantly with the reduction of the copper oxide.

Hydrogen uptakes corresponding to 9430 mls/g and 10831 mls/g were observed respectively for the low and high ramping rate profiles.

EXAMPLE 11

A pilot plant for effecting vapour phase hydrogenation of diethyl maleate according to the teachings of EP-A-0143634 and WO-A-86/03189 was charged with PG 85/1 copper chromite catalyst in the form of 4.5×4.5 mm pellets. This contained two beds of catalyst in series, the first bed being 1.83 m (6 feet) in depth and the second bed 0.91 m (3 feet) in depth. The catalyst was pre-reduced by a similar technique to that described in Example 1, using a gas flow rate corresponding to a space velocity of 3000 hr$^{-1}$. The pilot plant was then used to hydrogenate diethyl maleate under a variety of operating conditions for a period of 2000 hours. During this operating period the pressure ranged from 13.8 bar to 41.3 bar (200 psia to 600 psia) and the H$_2$:ester molar ratio from 200:1 to 400:1, while the inlet temperature to the first catalyst bed was in the range of from 160° C. to 175° C. and that to the second bed was from 170° C. to 180° C. The ester was supplied to the pilot plant at a liquid hourly space velocity of 0.15 hr$^{-1}$. The product was a mixture of butane-1,4-diol, gamma-butyrolactone and tetrahydrofuran plus minor amounts of by-products including diethyl ethoxysuccinate and n-butanol. The catalyst exhibited initially enhanced activity compared with a previous run in which the catalyst was heated to 140° C. under nitrogen before exposure of the catalyst to hydrogen. There was, however, some decline in catalyst activity with passage of time. At the end of the run the beds of catalyst were cooled to room temperature under a stream of hydrogen. The hydrogen was then purged from the system with nitrogen, followed by a 2% oxygen in nitrogen mixture produced by bleeding air into the nitrogen stream. When re-oxidation of the catalyst had ceased, as indicated by a substantially zero temperature rise across the catalyst beds, further air was gradually bled into the gas stream and the nitrogen supply was gradually turned off until air alone was being passed through the catalyst beds.

A sample of this re-oxidised material was crushed to form approximately 2 mm×2 mm granules and subjected again to the pre-reduction technique described in Example 2. Upon repeating the procedure of Example 2 similar results were obtained in copper metal surface measurements. Moreover, upon examining the re-reduced catalyst by transmission electron microscopy according to the procedure described in Example 9, it was shown that the copper particles in it substantially all have a particle size in the range of from about 30×10$^{-10}$m (about 30 Å) up to 300×10$^{-10}$m (about 300 Å), with an average particle size of about 50×10$^{-10}$m (about 50 Å).

EXAMPLE 12

The re-reduced catalyst produced by the procedure described in Example 11 is tested for catalyst activity in the same manner as is described for Example 1. A similar enhancement of catalyst activity to that observed in Example 1 is observed, compared with the results of Comparative Example A.

EXAMPLE 13

The re-reduced catalyst of Example 11 is pre-reduced by the conventional technique described in Comparative Example A. Upon testing the activity of the resulting re-reduced catalyst by the test procedure of Examples 1 and Comparative Example A it is adjudged that the catalyst activity is more akin to that of the pre-reduced material of Example 1 than to that of the pre-reduced material of Comparative Example A.

EXAMPLE 14

Example 1 and Comparative Example A are repeated for different copper chromite catalyst precursors having the following nominal chemical compositions:

Catalyst X: 53% by weight Cu and 17% by weight Cr:Cu/Cr atomic ratio 2.5.

Catalyst Y: 36.2% by weight Cu and 30% by weight Cr:Cu/Cr atomic ratio 1.21.

Catalyst Z: 36.2% by weight Cu and 30% by weight Cr with 10% by weight addded BaO.

Similar results to those observed for PG 85/1 catalyst are obtained.

EXAMPLES 15 TO 20

The catalyst of Example 1 is used for the hydrogenation of other unsaturated organic compounds under the following conditions, good yields being obtained in each case:

| Example No. | Compound | Product | Pressure | Temp. |
| --- | --- | --- | --- | --- |
| 15 | Ethyl acetate | Ethanol | 20 bar | 180° C. |
| 16 | Benzaldehyde | Benzyl alcohol | 20 bar | 85° C. |
| 17 | Acetone | Iso-propanol | 15 bar | 65° C. |
| 18 | Pyridine | Piperidine | 20 bar | 105° C. |
| 19 | Nitrobenzene | Aniline | 30 bar | 80° C. |
| 20 | Cyclohexene | Cyclohexane | 30 bar | 75° C. |

EXAMPLE 21

The catalyst of Example 1 is used in the dehydrogenation of ethanol to form acetaldehyde in high yield at 1 bar and 270° C.

What is claimed is:

1. A process for producing a hydrogenation catalyst in which a copper chromite is subjected to a pre-reduction treatment by heating in a pre-reduction zone in a reducing atmosphere at a pre-reduction temperature at which appreciable pre-reduction of the catalyst can be detected wherein, prior to effecting said pre-reduction treatment, the copper chromite is heated from ambient temperature in a reducing gas atmosphere comprising a minor amount of a reducing gas selected from hydrogen, carbon monoxide, and mixtures thereof, wherein the copper chromite is subjected to an ante-pre-reduction treatment by soaking it in a reducing gas atmosphere at a temperature below said pre-reduction temperature, and wherein during heating of the catalyst precursor over the range of from about 120° C. to about 170° C. the catalyst precursor is maintained under reducing conditions with the inlet and exit gas compositions to the pre-reduction zone being substantially identical one to another.

2. A process according to claim 1, in which heating to said pre-reduction temperature from ambient temperature is effected in a reducing gas atmosphere.

3. A process according to claim 1, in which the pre-reduction temperature is about 140° C. and the reducing gas contains hydrogen as the reducing constitutent.

4. A process according to claim 1, in which the copper chromite catalyst precursor is maintained in a reducing gas atmosphere at temperatures intermediate ambient temperature and the pre-reduction temperature.

5. A process according to claim 1, in which in the soaking step the reducing as atmosphere contains hydrogen, carbon monoxide, or a mixture thereof.

6. A process according to claim 1, in which in the catalyst precursor is heated under controlled conditions from ambient temperature in a stream of a reducing gas which comprises a mixture of a minor amount of hydrogen and a major amount of one or more inert gases.

7. A process according to claim 6, in which the reducing gas is a substantially oxygen-free mixture of a minor amount of hydrogen and a major amount of nitrogen.

8. A process according to claim 1, in which the soaking step is operated at a pressure in the range of from about 2 bar to about 10 bar.

9. A process according to claim 3, in which the soaking step is operated at a pressure in the range of from about 2 bar to about 10 bar.

10. A process according to claim 4, in which the soaking step is operated at a pressure in the range of from about 2 bar to about 10 bar.

11. A process according to claim 6, in which the soaking step is operated at a pressure in the range of from about 2 bar to about 10 bar.

12. A process according to claim 1, in which the partial pressure of the hydrogen or other reducing gas is in the range of from about 0.005 bar up to about 0.05 bar during the soaking step.

13. A process according to claim 8, in which the partial pressure of the hydrogen or other reducing gas is in the range of from about 0.005 bar up to about 0.05 bar during the soaking step.

14. A process according to claim 1, in which the catalyst precursor is heated at a controlled rate from ambient temperature to about 120° C. in a reducing atmosphere containing a minor amount of hydrogen.

15. A process according to claim 1, in which the temperature is increased at a substantially linear rate during the soaking step.

16. A process according to claim 1, in which the temperature is increased during the soaking step in steps of from about 5° C. to about 10° C., followed by periods during which the temperature is maintained substantially constant before the temperature is raised again.

17. A process according to claim 1, in which the temperature is increased in an approximately linear fashion from about 120° C. to about 170° C.

18. A process according to claim 17, in which heating is carried out in a series of steps of approximately 10° C. each.

19. A process according to claim 1, in which the rate of increase of temperature over the temperature range from about 120° C. to about 170° C. is from about 1° C./hour up to about 15° C./hour.

20. A process according to claim 1, in which in heating the catalyst precursor from about 120° C. to about 170° C. the gas flow rate corresponds to a gaseous hourly space velocity (measured at 0° C. and 1 bar) of from about 400 hr$^{-1}$ to about 6000 hr$^{-1}$.

* * * * *